(12) United States Patent
Appel et al.

(10) Patent No.: US 9,567,539 B2
(45) Date of Patent: Feb. 14, 2017

(54) APPARATUSES, SYSTEMS, MOBILE GASIFICATION SYSTEMS, AND METHODS FOR GASIFYING RESIDUAL BIOMASS

(71) Applicant: AG ENERGY SOLUTIONS, INC., Spokane, WA (US)

(72) Inventors: Philip W. Appel, Spokane Valley, WA (US); Thomas D. Weir, Pullman, WA (US); Jacob M. Culley, Spokane, WA (US); Timothy E. Farley, Spokane, WA (US); Daniel A. Howard, Cheney, WA (US); Sarah E. Love, Spokane, WA (US)

(73) Assignee: AG ENERGY SOLUTIONS, INC., Spokane, WA (US)

( * ) Notice: Subject to any disclaimer, the term of this patent is extended or adjusted under 35 U.S.C. 154(b) by 169 days.

(21) Appl. No.: 14/477,746

(22) Filed: Sep. 4, 2014

(65) Prior Publication Data

US 2015/0059245 A1    Mar. 5, 2015

Related U.S. Application Data

(60) Provisional application No. 61/877,824, filed on Sep. 13, 2013, provisional application No. 61/874,233, filed on Sep. 5, 2013.

(51) Int. Cl.
*B01J 7/00* (2006.01)
*C10J 3/72* (2006.01)
(Continued)

(52) U.S. Cl.
CPC .... *C10J 3/723* (2013.01); *C10J 3/32* (2013.01); *C10J 2200/156* (2013.01);
(Continued)

(58) Field of Classification Search
CPC combination set(s) only.
See application file for complete search history.

(56) References Cited

U.S. PATENT DOCUMENTS

| 4,278,064 A | 7/1981 | Regueiro |
| 4,428,308 A | 1/1984 | Birchfield et al. |

(Continued)

FOREIGN PATENT DOCUMENTS

| CN | 101693842 | 4/2010 |
| CN | 102492443 | 6/2012 |

(Continued)

OTHER PUBLICATIONS

First Examination Report for NZ Patent Appl. No. 718420 dated May 27, 2016.
(Continued)

*Primary Examiner* — Imran Akram
(74) *Attorney, Agent, or Firm* — Dorsey & Whitney LLP

(57) ABSTRACT

Apparatuses, systems, mobile gasification systems, and methods for gasifying residual biomass are described. An example system may include a mobile gasification system configured to gasify feedstock generated from residual biomass to provide syngas. The mobile gasification system may be configured to generate electrical power using the syngas. The mobile gasification system may be configured to be installed in a transportable structure.

13 Claims, 10 Drawing Sheets

(51) Int. Cl.
*C10J 3/32* (2006.01)
*C10K 1/02* (2006.01)

(52) U.S. Cl.
CPC .... *C10J 2200/31* (2013.01); *C10J 2300/0916* (2013.01); *C10J 2300/0956* (2013.01); *C10J 2300/165* (2013.01); *C10J 2300/1869* (2013.01); *C10J 2300/1884* (2013.01); *C10K 1/026* (2013.01); *Y02P 20/145* (2015.11)

(56) References Cited

U.S. PATENT DOCUMENTS

| | | | |
|---|---|---|---|
| 4,502,633 A * | 3/1985 | Saxon | C01B 3/363 239/132.3 |
| 4,599,092 A | 7/1986 | Eichelsbacher et al. | |
| 4,764,185 A * | 8/1988 | Mayer | C10J 3/26 48/111 |
| 4,872,954 A | 10/1989 | Hogan | |
| 5,026,403 A * | 6/1991 | Michel-Kim | C10J 3/02 48/203 |
| 5,138,957 A | 8/1992 | Morey et al. | |
| 7,763,088 B2 | 7/2010 | Feldmann | |
| 7,856,829 B2 | 12/2010 | Shah et al. | |
| 7,909,899 B2 | 3/2011 | Diebold et al. | |
| 7,947,155 B1 | 5/2011 | Green et al. | |
| 8,003,833 B2 | 8/2011 | Appel et al. | |
| 8,317,886 B2 | 11/2012 | Graham et al. | |
| 2003/0110994 A1 | 6/2003 | Lissianski et al. | |
| 2004/0182294 A1 | 9/2004 | Hahn et al. | |
| 2008/0086945 A1* | 4/2008 | Wunning | C10J 3/10 48/86 R |
| 2008/0283249 A1 | 11/2008 | Zubrin et al. | |
| 2009/0061372 A1* | 3/2009 | Just | F23D 1/00 431/284 |
| 2009/0064578 A1 | 3/2009 | Theegala | |
| 2010/0146858 A1* | 6/2010 | Zamansky | C10J 3/466 48/210 |
| 2010/0154304 A1 | 6/2010 | Tsangaris et al. | |
| 2010/0326087 A1 | 12/2010 | Kawase et al. | |
| 2011/0023363 A1 | 2/2011 | Mason | |
| 2011/0036014 A1 | 2/2011 | Tsangaris et al. | |
| 2011/0081290 A1* | 4/2011 | Carnegie | C10J 3/26 423/651 |
| 2011/0104575 A1 | 5/2011 | Mui et al. | |
| 2012/0145965 A1 | 6/2012 | Simmons et al. | |
| 2013/0199920 A1* | 8/2013 | Demir | C10J 3/26 201/16 |
| 2013/0313481 A1 | 11/2013 | Perez | |
| 2013/0340339 A1 | 12/2013 | Lee et al. | |
| 2014/0001406 A1* | 1/2014 | Kar | C10J 3/485 252/372 |
| 2014/0004471 A1 | 1/2014 | Vandergriendt et al. | |
| 2014/0048744 A1* | 2/2014 | Avagliano | C10K 1/04 252/372 |
| 2014/0230327 A1* | 8/2014 | Edmondson | C10J 3/02 48/89 |
| 2015/0090938 A1* | 4/2015 | Meyer | C10J 3/506 252/373 |
| 2015/0374935 A1* | 12/2015 | Bouchard | A24F 1/30 128/202.21 |
| 2016/0068770 A1 | 3/2016 | Appel et al. | |
| 2016/0068771 A1 | 3/2016 | Appel et al. | |
| 2016/0068772 A1 | 3/2016 | Appel et al. | |

FOREIGN PATENT DOCUMENTS

| | | |
|---|---|---|
| JP | 2009228958 A | 10/2009 |
| JP | 2011126997 A | 6/2011 |
| KR | 1019990081315 | 11/1999 |
| KR | 2002023280 | 3/2002 |
| KR | 1020050098801 | 2/2007 |
| KR | 100824599 B1 | 4/2008 |
| KR | 1020080067676 A | 7/2008 |
| KR | 20110026933 | 3/2011 |
| WO | 2013036694 A1 | 3/2013 |
| WO | 2013149170 A1 | 10/2013 |

OTHER PUBLICATIONS

"http://www.allpowerlabs.com/products/100kw-powertainer", Downloaded Jul. 10, 2015.
"https://www.youtube.com/watch?v=GrXt7RxWDzw", viewed on www.youtube.com on Aug. 4, 2015.
First Office Action for AU Appl. No. 2014315176 dated Nov. 15, 2016; pp. all.

* cited by examiner

APPARATUSES, SYSTEMS, MOBILE GASIFICATION SYSTEMS, AND METHODS FOR GASIFYING RESIDUAL BIOMASS

CROSS REFERENCE TO RELATED APPLICATIONS

We hereby claim benefit under Title 35, United States Code, Section 119(e) of U.S. provisional patent application Ser. Nos. 61/874,233 filed Sep. 5, 2013 and 61/877,824 filed Sep. 13, 2013. The 61/874,233 and 61/877,824 applications are hereby incorporated by reference into this application.

TECHNICAL FIELD

Embodiments described relate to gasification systems, and to mobile gasification systems using residual biomass, in particular.

BACKGROUND OF THE DISCLOSURE

Any discussion of the related art throughout the specification should in no way be considered as an admission that such related art is widely known or forms part of common general knowledge in the field.

The process of producing energy using gasification has been in use since the 1800s. However, few advancements in the technology have been realized over the years because of the availability and widespread adoption of fossil fuels. In recent years, alternative sources to fossil fuel energy have become more attractive due to global increases in demand for energy and the difficulty associated with sourcing additional fossil fuels. The problem of rising energy costs is only exacerbated by an aging electrical distribution infrastructure.

Agricultural industries have been some of the hardest hit by these increased energy costs because agricultural margins tend to be lower than in other industries and because the industry itself is tightly regulated. Meanwhile, advancements in agronomy have led to increased costs for the management of field residue. The costs associated with breaking down biomass waste have increased as field production rates have increased. Additionally, farmers may spend approximately 15% of their operating budget solely on electrical power requirements for irrigation needs.

SUMMARY

An example agricultural system that uses biomass gasification is disclosed herein. Disclosed systems and methods of operation utilize various improved gasification technologies to address the increase in costs and other problems associated with energy distribution. For example, a system may incorporate a mobile gasification system that is capable of using waste field residue to produce various valuable commodities, such as syngas, biochar, and/or electrical energy, thus providing an economically advantageous solution to the problems of existing power plants and farmers' field residue. The mobile attribute of the mobile gasification system may readily lend it to being placed in a farmer's field for convenient access to various farming systems (e.g. irrigation systems) and to the field residue itself. Thus, in some examples, electrical power can be provided for use throughout the growing and harvest seasons and the problems associated with traditional biomass plants, which require the transportation of the biomass to an offsite plant, are eliminated. During the off-season, the mobile attribute of may allow the mobile gasification system to be utilized to feed power into the homestead or to other systems thereby bypassing or surplussing an electrical grid, which may be susceptible to the impacts of storms and/or other attacks incidental or accidental. In one embodiment, the mobile gasification system may be configured to convert farm waste into electrical energy that is used to drive an irrigation system. An exemplary configuration, utilizes a mobile gasification system that is sized specifically to the available biomass and power demands of a specific field. For example, the mobile gasification system may be sized to utilize the field residue from one crop to provide the requisite power for irrigation of the next crop, while providing a balance between retained biomass for soil health and biomass for power generation. Thus, the mobile gasification system may save the farmer both power and tillage costs with minimal requirements for maintenance, while providing the advantages of baling and stacking the residue from their field in proximity to the power generation system.

Other advantages of the mobile gasification system exist, as well. For example, the mobile gasification system may be configured to store all or a portion of the generated syngas. The stored syngas may be used in place of natural gas or propane that is ordinarily piped into a home or commercial boiler, furnace, and/or range without significant changes to those systems. In an example, the mobile gasification system may have a modular configuration that allows for installation and removal of a syngas storage tank that can be used to transport stored syngas from the mobile gasification system, for example, back at the homestead, for connections to systems there, rather than moving the entire mobile gasification system. Another advantage offered by the mobile gasification system, is that multiple mobile gasification systems can be used in parallel to provide syngas, electricity, heat or combinations of these and the other outputs, etc. For example, two or more mobile gasification systems may be coupled such that their electrical outputs both feed a common irrigation system, or other system, in parallel. Likewise, two or more mobile gasification systems may output syngas into a common storage tank, such as one that might serve syngas to the homestead.

The modular configuration may have several other advantages. For example, in one case it may be desirable to configure the mobile gasification system for storage of generated syngas. In another case, it may be desirable to configure the mobile gasification system to burn the generated syngas in a furnace. In another case, it may be desirable to configure the mobile gasification system to generate electricity using the syngas. In another case, it may be desirable to configure the mobile gasification system to store a portion of the generated syngas in a smaller tank, while utilizing another portion of the generated syngas to generate electricity. These and other configurations are enabled by the design of the mobile gasification system by swapping one or more modules out for one or more other module(s).

A gasifier disclosed herein may use several mechanisms, including a preheater that is capable of using hot syngas to preheat combustion air and incoming feedstock. Another mechanism of the gasifier disclosed herein is a stirring mechanism that may serve to prevent or reduce char and clinker buildup within the gasifier, as compared with gasifiers that incorporate filter screens at the outlet of the gasifier to trap char, ash, and other byproducts. These screens are highly prone to clogging and the silica present at the high levels in field straw quickly accumulates and glassifies at the temperatures present inside the gasifier. Not only does glassification of silica further clog the filter screen, but also it can quickly render the entire gasifier inoperable. The stirring mechanism may sweeps accumulations of biochar and other materials out of the syngas path, rather than filtering the biochar and other materials, and passes the syngas through a cyclone to separate out any entrained ashes. This stirring mechanism approach not only facilitates gasification of field straw, but may achieve a controllable gasification rate by utilizing the stirring mechanism to agitate the feedstock being gasified.

Examples of systems within the scope of the disclosure are provided. An example system may include a mobile gasification system configured to gasify feedstock generated from residual biomass to provide syngas. The mobile gasification system may be configured to generate electrical power using the syngas. The mobile gasification system may be configured to gasify feedstock generated from residual biomass to provide a supply of syngas and configured to generate electrical power using a portion of the generated syngas, wherein the mobile gasification system is configured to be installed in a transportable structure.

An example mobile gasification system may include a gasifier configured to gasify feedstock by reacting the feedstock with combustion air in a gasification chamber to provide the syngas. The gasifier may include a preheater assembly configured to exchange and/or transfer heat from the syngas to the combustion air and the feedstock.

Example methods are disclosed herein. An example method may include determining a maximum temperature based on temperature data from a plurality of temperature sensors. The temperature data may indicate temperatures of multiple locations within a gasification chamber of a gasifier. The example method may further include determining whether the maximum temperature is decreasing as compared with a previous maximum temperature. The example method may further include setting a time delay between stirring actions within the gasification chamber based on at least one of the maximum temperature or whether the maximum temperature is decreasing as compared with the previous maximum temperature.

An example method may include monitoring a feedstock level in a staging hopper of a gasifier, and activating a feedstock transfer mechanism to add feedstock to the staging hopper responsive to detecting that the staging hopper is below a low threshold.

There has thus been outlined, rather broadly, some of the features and embodiments of the disclosure in order that the detailed description thereof may be better understood, and in order that the present contribution to the art may be better appreciated. There are additional features and embodiments of the disclosure that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, examples, features, and attendant advantages of the present disclosure will become fully appreciated as the same becomes better understood when considered in conjunction with the accompanying drawings, wherein.

DETAILED DESCRIPTION

The present disclosure is generally directed to a mobile gasification system that may be used to fulfill the needs for sustainable energy solutions across the wide breadth of the agricultural industry. The mobile gasification system may use organic matter, such as residual biomass from a farming operation, to produce power for use in agricultural applications and/or for sales to the grid. While farming operations are the primary focus of this disclosure, other agricultural operations, such as logging, cultivation of algae, etc., are within the purview for use of the systems of this disclosure. Many of the specific details of certain embodiments of the disclosure are presented in the following description and in FIGS. 1-11, to provide a thorough understanding of such embodiments. One skilled in the art will understand, however, that the present disclosure may have additional embodiments, or that the present disclosure may be practiced without several of the details described in the following description.

Figure 1:
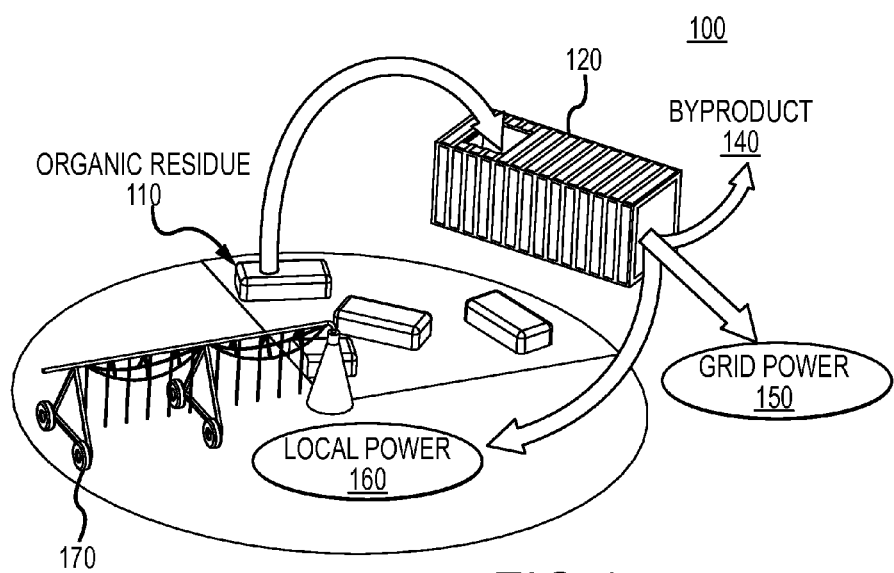
FIG. 1 is an illustration of an agricultural system according to an embodiment of the disclosure.

FIG. 1 illustrates an agricultural system 100 according to an embodiment of the disclosure. The agricultural system 100 includes a mobile gasification system 120 that gasifies residual biomass 110 left after harvesting a crop. Mobile gasification system 120 may gasify residual biomass 110 to produce syngas that may be burned to generate grid power 150 and/or local power 160. Mobile gasification system 120 may be housed in a shipping container or other container that is capable of being transported (e.g., moved) from one site to another. Gasification system 120 may combine gasification and power generation technologies with automation and control systems to produce an autonomous and mobile power generation unit that uses residual biomass, such as straw (e.g., from wheat, oats, etc.) or other non-harvested organic field residue to produce an useful end product. That is, mobile gasification system 120 may gasify residual biomass 110 to generate producer's gas (e.g., syngas), which may be used to generate power, heat, or another output. In some examples, mobile gasification system 120 may generate grid power 150 to sell back to the grid. In other examples, mobile gasification system 120 may generate local power 160, which may assist with producing the next crop, such as powering irrigation system 170.

In addition to grid power 150 and/or local power 160, gasification of residual biomass 110 by mobile gasification system 120 may produce a byproduct 140. Byproduct 140 may include activated charcoal (e.g., biochar) or flyash, which may be sold or added back to the field as a fertilizer. For example, biochar may be used for soil remediation and may increase water retention and nutrient retention. By adding biochar to the soil, watering and fertilizer costs may be reduced.

In an example implementation, mobile gasification system 120 may use residual biomass 110 to provide electrical power to drive irrigation system 170. Mobile gasification system 120 may be sized to a specific field such that the residual biomass from one crop (e.g., small grain straw) will provide power for that same field for the next crop. In some examples, rather than or in addition to sizing the mobile gasification system 120, two or more of mobile gasification systems 120 may be coupled together in parallel to provide electrical power to drive irrigation system 170 or generate local power 160, or for another purpose. This approach saves the farmer both power and tillage costs while providing the advantages of baling and stacking the residual biomass from their field in proximity to mobile gasification system 120. Using mobile gasification system 120 in this manner to convert the residual biomass into a valuable commodity addresses residue and tillage problems, while eliminating or reducing the need to manage crop waste.

Further, mobile gasification system 120 may provide other economic advantages such as a net $CO_2$ reduction. By reducing the amount of residual biomass that needs to be broken down by tillage, the number of tillage passes is also reduced. Mechanical means of agitating the soil and breaking up the residual biomass typically requires extensive amounts of fuel (e.g. diesel) to operate the equipment. Removing the residual biomass and converting it into a useful commodity removes some or all of the tillage needs. Additionally, extra fertilizer is usually required to break down some small grains, to accelerate the decomposition rate of the biomass. By removing the biomass, the amount of fertilizer required can be reduced or eliminated entirely. Non-irrigating grain farmers can benefit from these savings in tillage and fertilizer costs alone. During the off-season or on non-irrigated farms, mobile gasification system 120 may be located at the homestead or at another location with accessibility to the electrical grid and may be utilized to provide grid power 150 into the electrical grid. Further, farming equipment that is normally configured to run on propane can be easily modified to utilize the produced syngas.

Figure 2:
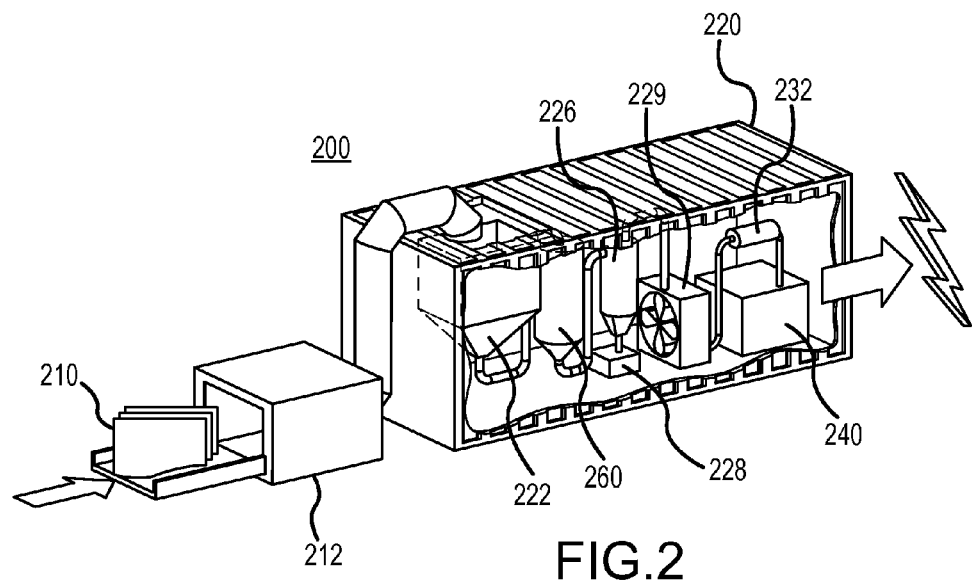
FIG. 2 is an illustration of a mobile gasification system according to an embodiment of the disclosure.

FIG. 2 illustrates a system 200 according to an embodiment of the disclosure. System 200 may be included in mobile gasification system 120 of FIG. 1. System 200 may include, a shredder 212 configured to preprocess bales of residual biomass 210 to produce feedstock fit for a mobile gasification system 220 configured to receive the feedstock for use during the gasification process. The feedstock may be fed into a hopper 222 of mobile gasification system 220. The feedstock may be provided to a gasifier 260 based on a feed mechanism and metering system contained in hopper 222. Gasifier 260 may break down (e.g., gasify) the feedstock to produce syngas and a byproduct, such as biochar or flyash. Gasifier 260 may provide the syngas to a cyclone 226, which may separate the syngas from waste materials (e.g., slag and 'clinkers') entrained in the syngas. The waste materials may be caught in an ash trap 228. The syngas may be provided to a heat exchanger 229 via cyclone 226 to remove heat from the syngas. Heat exchanger 229 may provide the cooled syngas to a generator 240 via a filter 232. Filter 232 may remove additional waste materials entrained in the syngas, such as water and carbon dioxide. Generator 240 may use the syngas to provide electrical power as an output. The biochar and/or flyash may be collected from gasifier 260 and may be distributed over a field to provide vital minerals back into the soil for future crops.

For mobile gasification system 220, the residual biomass may be reduced in size to enable flow through hopper 222 and/or gasifier 260. In some examples, the residual biomass size may be reduced by shredding bales via shredder 212 such that it possesses an angle of repose less than 90 degrees to avoid bridging of the feedstock in hopper 222 and/or gasifier 260. A stirring mechanism may also be included in gasifier 260 that prevents the feedstock from compacting or bridging.

Hopper 222 may include a metering bin to control the volume of the feedstock that is fed into gasifier 260 based on feedback from level sensors that read feedstock levels within gasifier 260 and/or based on level sensors that read feedstock levels within hopper 222. The metering bin may include air locks to control air entering and/or leaving gasifier 260. The air locks may ensure that the air entering gasifier 260 is not received from the feed system (e.g., the hopper 222). Additionally, the air locks may provide fire suppression safety. For example, a control system that independently controls the air lock at the outlet of hopper 222 and air locks at the inlets of hopper 222, as well as the feed mechanism (e.g., the transport auger, to ensure it is fully emptied) may prevent combustion caused by back feeding feedstock and hot air from the gasifier 260 to the hopper 222. Likewise, the control system may also be used to control an operating pressure within gasifier 260 by opening and closing the air locks at appropriate times.

In some examples, mobile gasification system 220 may be constructed using a modular design that allows components to be installed and removed to allow additional or different components to be used with mobile gasification system 220. For example, it may be desirable to configure mobile gasification system 220 to store all of the generated syngas. In another configuration, it may be desirable to configure mobile gasification system 220 to burn the generated syngas in a furnace. In another configuration, it may be desirable to configure mobile gasification system 220 to generate electricity using generated syngas. In another configuration, it may be desirable to configure the mobile gasification system 220 for any combination of the aforementioned uses. In some examples, it may be desired to connect two or more of the mobile gasification systems 220, such as to provide electrical power in parallel or to provide syngas to a common storage tank. These and other configurations may be enabled by the design of the mobile gasification system 220 by swapping one or more modules out for one or more other module(s) corresponding to a desired use of the mobile gasification system. For example, in addition to or in lieu of generator 240, a storage tank, or a furnace may be included in mobile gasification system 220 to accommodate a corresponding use case. The storage tank may be removed and relocated to provide syngas for use in place of natural gas or propane that is ordinarily piped into a home or commercial boiler, furnace, and/or range without significant changes to those systems. Thus, modular design of the mobile gasification system 220 may allow installation and removal of a storage tank that can be used to transport stored syngas from the mobile gasification system 220, for example, back at the homestead, for connections to systems there.

Figure 3:
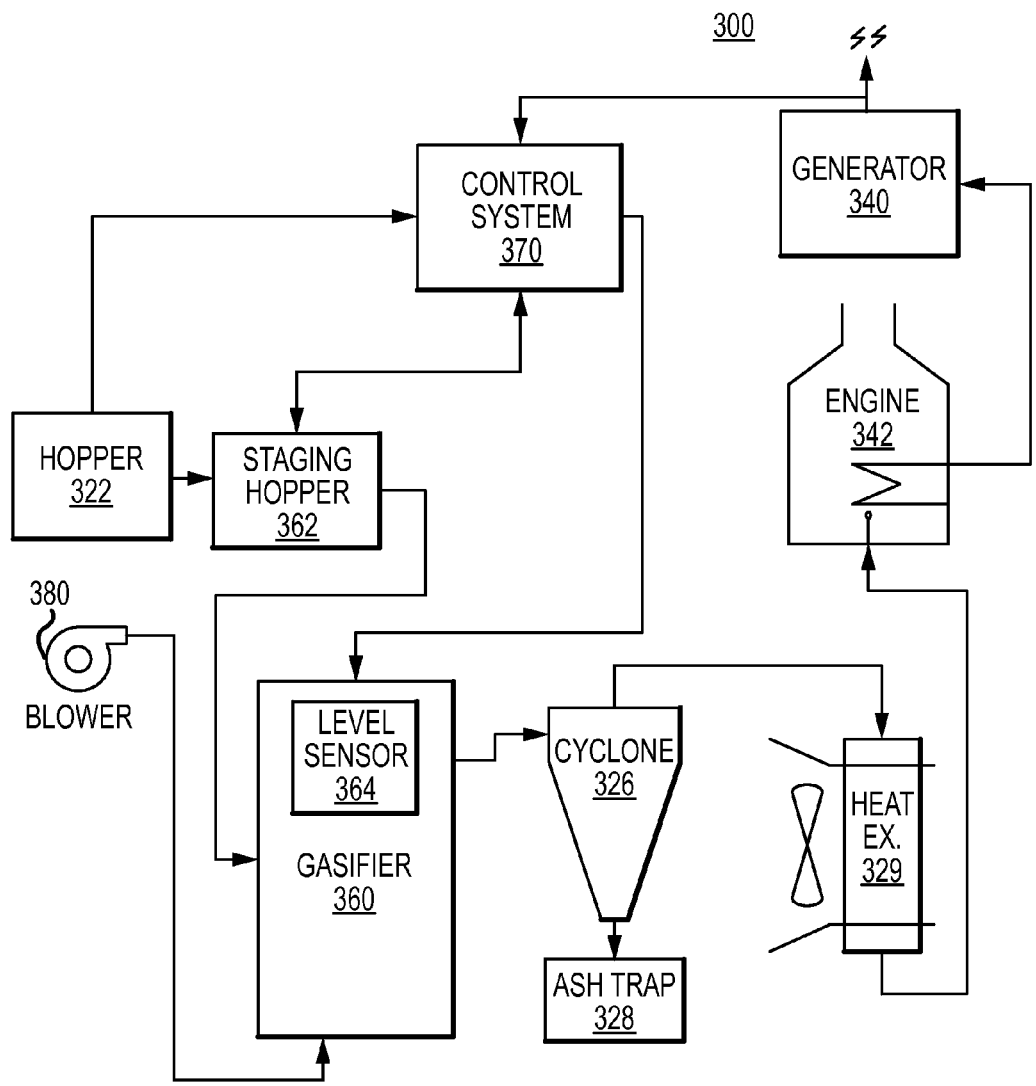
FIG. 3 is a block diagram of a mobile gasification system according to an embodiment of the disclosure.

FIG. 3 is a block diagram of a mobile gasification system 300 according to an embodiment of the disclosure. The mobile gasification system 300 may be included in mobile gasification system 120 of FIG. 1 and/or system 200 of FIG. 2. Mobile gasification system 300 may include a hopper 322, a staging hopper 362, and a blower 380 that feed the feedstock and combustion air into a gasifier 360. Gasifier 360 may provide syngas as an output to a cyclone 326. Cyclone 326 may be configured to separate ash and 'clinkers' that become entrained in the syngas flow and to provide the syngas to a heat exchanger 329. An ash trap 328 may collect the generated ash and clinkers separated from the syngas in cyclone 326.

Heat exchanger 329 may extract heat from the syngas provided to it by cyclone 326. Heat exchanger 329 may provide the cooled syngas to an engine 342. Engine 342 may use the syngas as fuel to operate. Engine 342 may be coupled to a generator 340, and may drive generator 340 to provide electrical power.

In operation, mobile gasification system 300 may gasify feedstock generated from residual biomass. The feedstock may be provided from hopper 322 to gasifier 360 via staging hopper 362. Mobile gasification system 300 may be a continuous flow system such that the feedstock is delivered from hopper 322 to gasifier 360 via staging hopper 362 in a continuous fashion to enable an uninterrupted flow of feedstock within the combustion of the chamber gasifier 360 for continual operation thereof. Gasifier 360 may gasify the feedstock by reacting it with heat and combustion air. The combustion air may be introduced to gasifier 360 via blower 380. Blower 380 may be coupled to gasifier 360 such that airflow through gasifier 360 is controlled in two different ways. That is, blower 380 may be connected to gasifier 360 to push combustion air into gasifier 360, or pull syngas from gasifier 360. In other words, gasifier 360 may operate under vacuum (e.g., with blower 380 coupled between the output of gasifier 360 and the input of cyclone 326) or under pressure (e.g., with blower 380 coupled to an input of gasifier 360). Each method has its advantages. The use of a vacuum system removing the syngas from the gasifier 360 may eliminate a potential for leakage of flammable gas to the atmosphere, as the entire system is at a negative pressure relative to the atmosphere. If a leak did develop, ambient air would be forced into gasifier 360, rather than flammable syngas leaking out.

The use of a pressure system to inject the combustion air into the gasifier 360 may reduce a likelihood of fouling of the blower 380, because the combustion air is relatively clean as compared to syngas, which may include tars and other entrained particulates that can foul blower 360 and degrade its operation or cause it to malfunction. In some examples, mobile gasification system 300 may be configurable to switch between pressure and vacuum operation based on desired operating conditions.

Gasifier 360 may include a preheater that preheats the combustion air and feedstock using hot syngas output from the preheater prior to cyclone 326. Heating the combustion air and/or the feedstock improves gasification efficiency. For example, heating the feedstock may reduce its moisture content prior to entering gasifier 360. Additionally, preheating the combustion air using the generated syngas drives up system efficiency by reducing the time required for gasification temperatures within gasifier 360 to be reached.

Cyclone 326 may be useful for separating ash and 'clinkers' that become entrained in the syngas flow and for providing cleaned syngas to heat exchanger 329. Ash trap 328 may collect the generated ash and clinkers separated from the syngas by cyclone 326. Upon receiving cleaned syngas from cyclone 326, heat exchanger 329 may provide cooled syngas to engine 342. Engine 342 may use the provided syngas as fuel to operate. Engine 342 may be coupled to a generator 340, and may drive generator 340 to provide electrical power. In some examples, engine 342 and/or generator 340 may be replaced with any combination of a storage tank, a furnace, a pump, or other device which may use or be driven by the syngas produced by gasifier 360 or through which stored syngas energy or syngas can be output (turbine, blower, etc.). Control system 370 may be used to control various components of mobile gasification system 300 based on data collected from its components. For example, control system 370 may control when to feed more feedstock from hopper 322 to gasifier 360 via staging hopper 362 based on an input from a level sensor 364 that is reading a feedstock level in gasifier 360. In some embodiments, control system 370 may measure a power output of generator 340 to determine whether too little or too much syngas is being produced, for example, to operate engine 342. Note that while level sensor 364 is shown contained within gasifier 360, other arrangements may be preferable.

Figure 4:
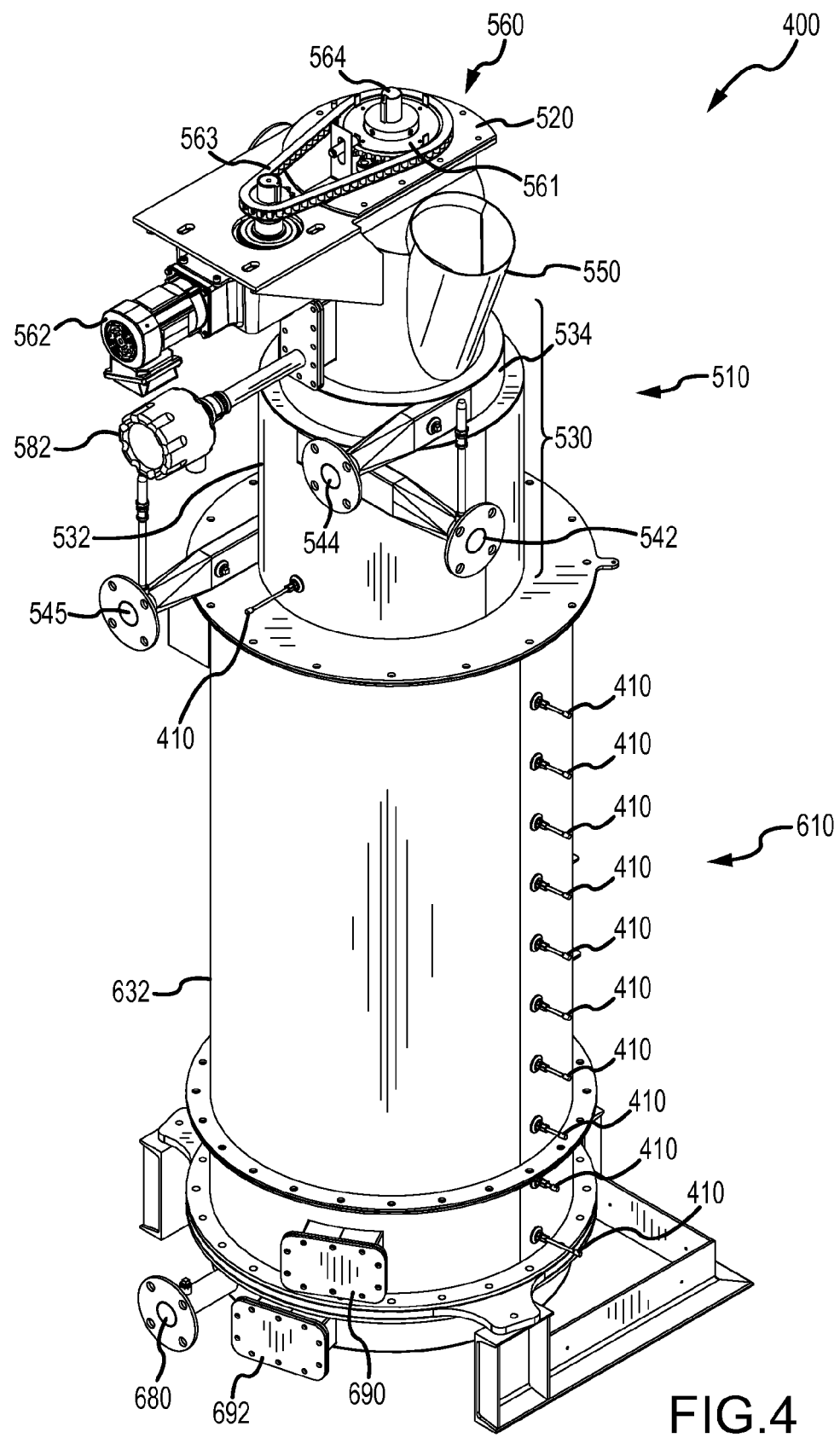
FIG. 4 is an isometric view of a gasifier according to an embodiment of the disclosure.
Figure 5:
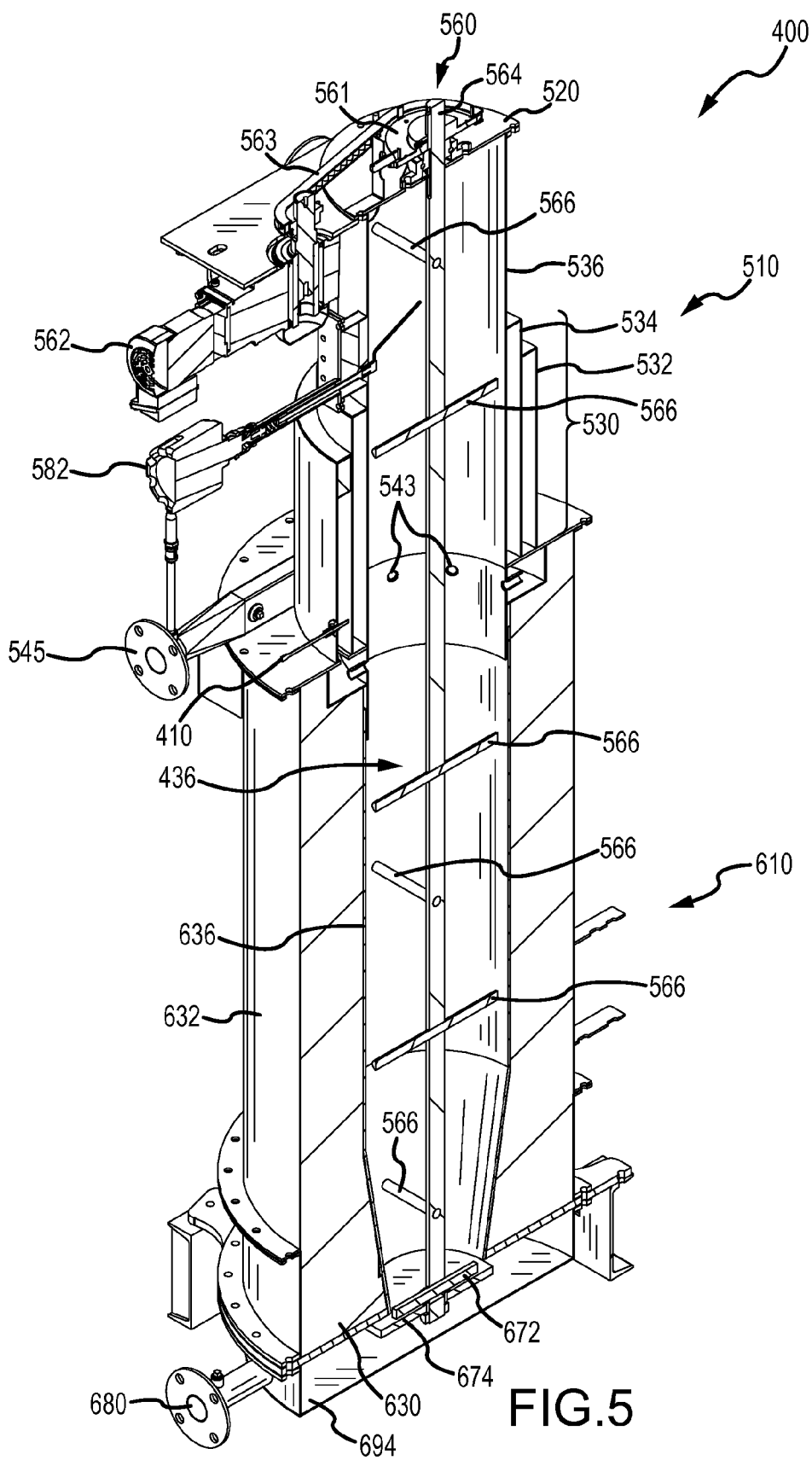
FIG. 5 is a cross-sectional isometric view of the gasifier of FIG. 4 according to an embodiment of the disclosure.
Figure 6:
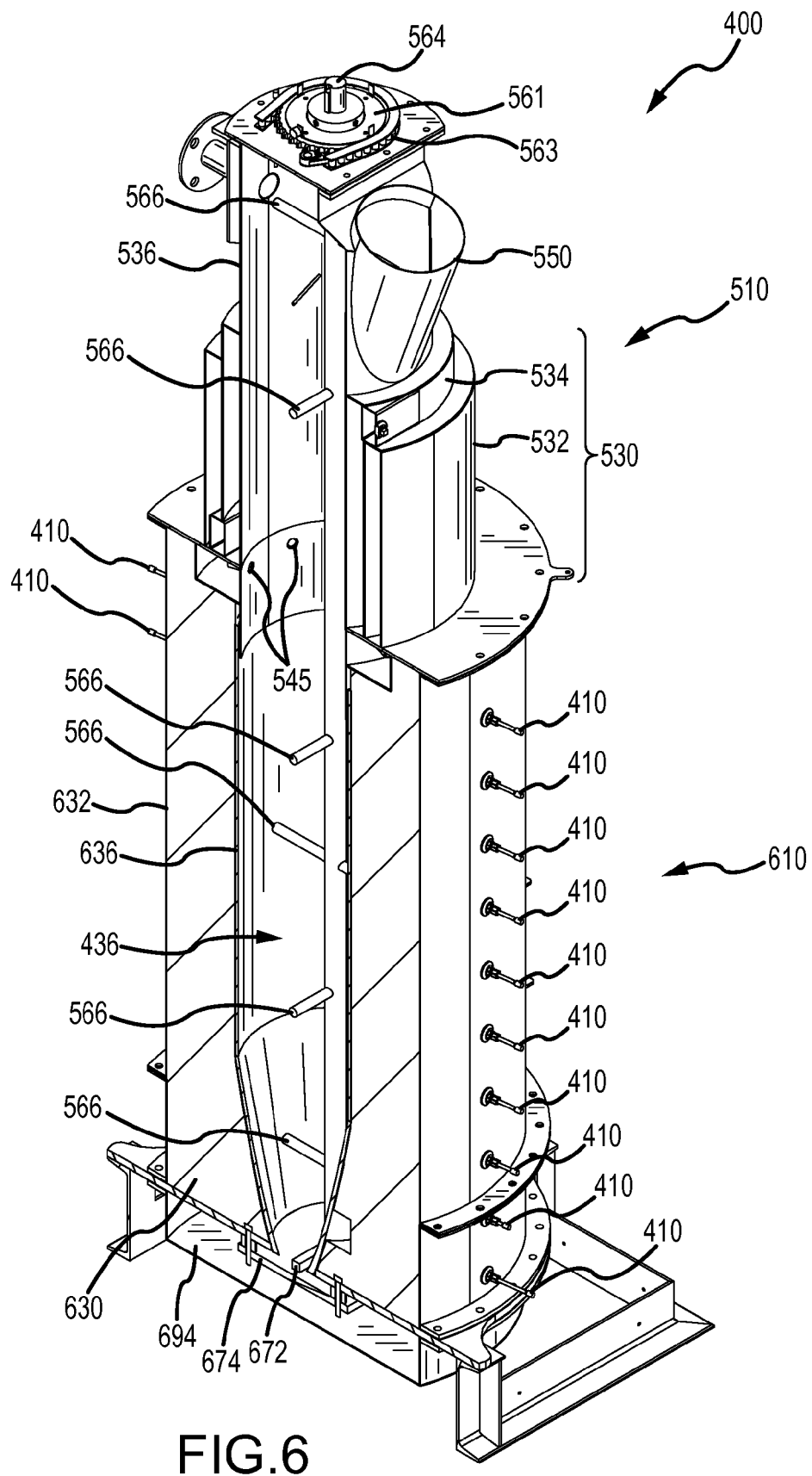
FIG. 6 is a cross-sectional isometric view of the gasifier of FIG. 4 according to an embodiment of the disclosure.

FIG. 4 depicts an isometric view of a gasifier 400, such as gasifier 260 of FIG. 2 or gasifier 360 of FIG. 3. FIGS. 5 and 6 depict cross-sectional views of gasifier 400 of FIG. 4 as viewed from different sides. In some examples, gasifier 400 may be constructed primarily of two sections: upper section 510 and lower section 610. The sectional design of gasifier 400 may allow for maintenance and replacement of the sections independently, as necessary. Gasifier 400 depicted in FIGS. 4-6 includes common figure numbers for common elements.

Upper section 510 may include a preheater assembly 530. Preheater assembly 530 may include three concentric tubes: an outer shell 532, a preheater shell 534, and an upper fire tube 536. Outer shell 532 may receive the combustion air at a top portion via a combustion air inlet 542 and circulate the combustion air in a circular pattern around outer shell 532 before it is injected into an upper portion of upper fire tube 536 via any one or more of several tuyeres 543. Upper fire tube 536 may be an inner most tube of preheater assembly 530 and may be mounted to an upper cap plate 520 at the top of gasifier 400. Upper fire tube 536 may receive the preprocessed feedstock via a feedstock inlet 550, which is combined with the combustion air received via tuyeres 543 to sustain the gasification process.

Preheater shell 534 may be sandwiched between outer shell 532 and upper fire tube 536. Preheater shell 534 may receive hot syngas from an output of lower section 610 (e.g., a syngas outlet 680) at a preheater syngas inlet 544, and circulate the hot syngas in a circular pattern around preheater shell 534 before it is output at preheater outlet 545.

Upper section 510 may also include a level sensor 582 that enables a control system, such as control system 370 of FIG. 3, to determine a level of feedstock entering gasifier 400 via feedstock inlet 550. Level sensor 582 may be a rotating paddle wheel-type sensor or other sensor capable of measuring levels of gasifier feedstock. When the feedstock reaches a sufficient level, the paddle wheel of level sensor 582 may be prevented from rotating indicating that the level of the feedstock is adequate, whereas a rotating paddle wheel may indicate that additional feedstock is required for gasification.

Lower section 610 of gasifier 400 may be constructed using two concentric steel tubes: a lower fire tube 636 and an outer shell 632. Lower fire tube 636 may be connected to the bottom of upper fire tube 536 to form gasification chamber 436. The gap between lower fire tube 636 and outer shell 632 may be filled with an insulating material (e.g., high temperature alumina wool insulation) to increase thermal efficiency by reducing an amount of heat that escapes from lower fire tube 636 to the atmosphere. The two-tube construction of lower section 610 may result in a high thermal expansion difference between lower fire tube 636 and outer shell 632, which may cause lower fire tube 636 to warp if fully constrained. Fire tube base 630, in combination with upper cap plate 520, may serve to stabilize lower fire tube 636 and upper fire tube 536, respectively. Fire tube base 630 may additionally act as a stabilization ring that holds lower fire tube 636 in its proper position, yet allows it to expand radially and longitudinally as the temperature within gasification chamber 436 increases. The dual tube construction of lower section 610, and the split construction of the top and bottom sections (i.e., upper section 510 and the lower section 610), provide a means that facilitates replacement of upper fire tube 536 and/or lower fire tube 636, when required as it is these components that will be under the greatest thermal stresses. In some embodiments, upper fire tube 536 and lower fire tube 636 may be constructed as a single, continuous tube, or constructed of other temperature tolerant materials besides steel including plated steel, other temperature tolerant alloys, or even refractory materials such as ceramic alumina or aluminum nitride as are commonly known and used in the art.

Lower section 610 may include a syngas outlet 680 at the bottom to provide an output for generated syngas. Syngas outlet 680 may be connected to preheater syngas inlet 544 via a pipe or tube to supply the syngas through preheater assembly 530.

Gasifier 400 may additionally include a stirring mechanism 560 that extends through the gasification chamber 436 from the top of upper fire tube 536 to the end of lower fire tube 636. Stirring mechanism 560 may include a motor 562, a stir rod 564, several mixing rods 566, a sweep rod 672, and sweep plate 674. Stir rod 564 may be splined at the top for attachment of a gear 561. At the bottom of gasification chamber 436, stir rod 564 may protrude through sweep plate 674, where stir rod 564 is fitted with an attachment means to hold it in place (e.g., via a lock collar, bushing, and/or a thrust washer). Stir rod 564 may be similarly restrained at the top of gasifier 400 via upper cap plate 520. Gear 561 may be driven by motor 562 via a drive chain 563. Positioning gear 561, motor 562, and drive chain 563 at the top of gasifier 400 improves reliability of these components by keeping the drive mechanism at a lower temperature as compared with placing these components at the bottom of the gasifier 400.

Mixing rods 566 may be affixed (e.g., welded or attached via another means such as threaded holes) perpendicularly to stir rod 564. In some examples, mixing rods 566 may be affixed at an angle other than perpendicular to stir rod 564. In some examples, mixing rods 566 are cylindrical (i.e. having a circular cross section), in other examples, mixing rods 566 may have other cross sectional shapes.

Sweep rod 672 may be affixed to a bottom end of stir rod 564 and such that it is situated to form a small clearance above sweep plate 674. This arrangement allows sweep rod 672, and ultimately stirring mechanism 560 to rotate freely. Sweep plate 674 may be removably attached to fire tube base 630 such that sweep plate 674 forms a small gap underneath fire tube base 630. Affixing sweep plate 674 below fire tube base 630 in a way that allows it to be removed facilitates replacement of sweep plate 674 as needed. The gap formed between fire tube base 630 and base plate 674 serves as a passageway for the syngas to exit gasification chamber 436. Sweep plate 674 may be positioned such that the gap formed between it and fire tube base 630 is sufficiently narrow so as to accelerate the exiting syngas. A higher velocity syngas stream though this region helps to keep slag and 'clinkers' entrained in the syngas stream until it exits through preheater outlet 545 to assist in the prevention of clogging of this region. Service port 690 may allow for access to an area under fire tube base 630, to facilitate, for example, replacement of sweep plate 634.

A byproduct collection pan 694 may be included at the base of gasifier 400 to collect byproduct particles (e.g., activated charcoal and/or flyash generated during gasification) that are broken up and swept off sweep plate 674 by sweep rod 672 during the gasification process. Particles that are swept off sweep plate 674 by sweep rod 672 may be removed through collection pan access port 692.

Gasifier 400 may include several temperature sensors 410 positioned at different points along upper fire tube 536 to determine a temperature profile within this region of gasification chamber 436. A control system, such as control system 370 of FIG. 3, may use the temperature data from the several temperature sensors 410 to determine when to activate stirring mechanism 560 to speed up or slow down propagation of the feedstock through upper fire tube 536, or to activate or deactivate one or more of the tuyeres 543 in order to control temperature within the same region.

In operation, feedstock is provided via a feedstock inlet 550 and combustion air is received via combustion air inlet 542. The combustion air is injected into the region of gasification chamber 436 defined by upper fire tube 536 via one or more of the tuyeres 543. A startup procedure may include reversing the flow of the gasses through gasifier 400. For example, in some cases, during the startup process, the airflow through the gasifier 400 may be reversed, such that exhaust gases may be relieved through the preheater outlet 545.

After the startup is complete, combustion of the feedstock in gasification chamber 436 may cause a reaction between the combustion air and the feedstock causing the feedstock to chemically transform (i.e. gasify) as it moves down through gasification chamber 436. For example, the combustion air injection may be used to add $O_2$ in the char zone of gasification chamber 436 and decrease production of char. The rate of the combustion air injection may be adjusted to optimize the production of $CH_4$ and CO, thereby reducing $CO_2$ production and increasing the energy content of the syngas. Increasing the amount of combustion air within gasification chamber 436 too much may result in an increased temperature within the portion of gasification chamber 436 defined by upper fire tube 536, causing glassification of ash. Glassification of the ash may result in increased clinker formation, which may create blockages in the flow of syngas and ash or activated charcoal from gasification chamber 436 and is highly undesirable.

The combustion air may be provided to into gasification chamber 436 via any of several tuyeres 543 located on the circumference of upper fire tube 536 and/or lower fire tube 636. Tuyeres 543 may each contain a controlled metering valve that regulates the air flow rate to the power demand (e.g., at the output of generator 340 of FIG. 3). At least one set of the tuyeres 543 may be open to appropriately distribute the combustion air based on a ratio of required combustion air between a first location and subsequent locations as a function of, for example, the moisture content of the incoming feedstock. The balance of air injected between the various tuyeres 543 may be used to maintain ratios of the syngas' constituent components and, thus, an overall energy content of the syngas.

The total air volume inlet into the region of gasification chamber 436 defined by upper fire tube 536 is adjusted to ensure the gasification chamber 436 is within a desired (e.g., preset, predetermined, preconfigured) temperature threshold. At the desired temperature threshold, gasification occurs with minimal tar products. Higher temperatures may result in less efficient use of the feedstock. Temperature measurements taken via the temperature sensors 410 along the combustion path in gasification chamber 436 may be used to identify a maximum temperature in gasification chamber 436 and may be used to control a flow rate of the feedstock through gasification chamber 436 to maintain the desired temperature threshold value.

A control system may alter the flow rate of feedstock through gasification chamber 436 by activating or deactivating stirring mechanism 560. As stirring mechanism 560 is activated, the flow rate of feedstock through gasification chamber 436 may increase, and when stirring mechanism 560 is deactivated, flow rate through gasification chamber 436 may decrease. Stirring mechanism 560 may aid in preventing feedstock from forming bridges or otherwise becoming clogged in gasification chamber 436 and serves to help prevent build up of char particles in this region. In addition, activation of stirring mechanism 560 aids in preventing tunneling through the hot char column along the gasification chamber 436, which may undesirably allow combustion air to bypass a portion of the feedstock within gasification chamber 436 and prevent complete a reaction.

In gasification chamber 436, temperatures can be very sensitive to stirring action. Too much stirring may cause collapse of a hot char column structure, which may cause a larger pressure drop through the gasifier 400 than is desirable, as well as reduced syngas flow and loss of temperature control. Too little stirring may result in tunneling through the hot char column structure which may result in localized temperature extremes and non-homogenous combustion. Thus, the control system may direct stirring mechanism 560 to rotate at a fixed speed and for a fixed duration. Temperatures within combustion chamber 436 may be further controlled by adjusting an amount of time between consecutive stirring actions.

Further, the gasification process may require relatively dry fuel. The residual organic residue may be fully exposed to the elements prior to its use in gasification, which may lead to a very wide range of feedstock moisture contents. In many cases, this moisture level may be well above the upper threshold permitted for gasification. In order to mitigate high feedstock moisture levels, preheater assembly 530 may use hot syngas output from the syngas outlet 680 to heat and dry the feedstock as it enters gasification chamber 436, as well as heat the combustion air as it traverses from the combustion air inlet 542 to tuyeres 543. Drying and heating the feedstock and the combustion air may reduce moisture levels of the feedstock and make the gasification process more efficient.

In some embodiments, the combustion air circulating through the outer shell 532 may be input in a counter-flow configuration, as compared with the syngas entering preheater shell 534, in order to optimize heat transfer between the combustion air and the syngas. Preheating the combustion air and the feedstock in this way may reduce an amount of the feedstock that must be burned to get gasification chamber 436 to a threshold temperature (e.g., 233° C.). The cyclonic action of the syngas and combustion air flow within preheater assembly 530 may keep entrained ash suspended in the syngas while in preheater shell 534. Further, reducing the temperature of the syngas during the heat exchange may reduce stress on downstream components, such as cyclone 326 and/or heat exchanger 329 of FIG. 3, which may increase the overall efficiency of the system.

As feedstock is gasified, byproducts, such as biochar and/or flyash, along with the syngas, may be produced and exited from gasification chamber 436. The gap formed between fire tube base 630 and base plate 674 may serve as a passageway for the syngas to exit gasification chamber 436, and may be sufficiently narrow so as to accelerate the exiting syngas, which may help keep the slag and 'clinkers' entrained in the syngas stream until it exits preheater outlet 545.

Further, sweep rod 672 may sweep the byproduct off the sweep plate in order to keep the passageway out of gasification chamber 436 clear for syngas passage. Byproduct collection pan 694 may collect byproduct particles that are broken up and swept off sweep plate 674 by sweep rod 672. Particles that are swept off sweep plate 674 by sweep rod 672 may typically be no more than bb sized and may easily be removed through service port 692, such as via a vacuum, a broom, or conveyed out in a slurry via a pump. The removal of the byproduct may be performed manually or implemented via a control system, such as control system 370 of FIG. 3. The collected byproduct may be redistributed onto fields to help retain vital nutrients and improve soil fertility, or may be sold at market value.

Figure 7:
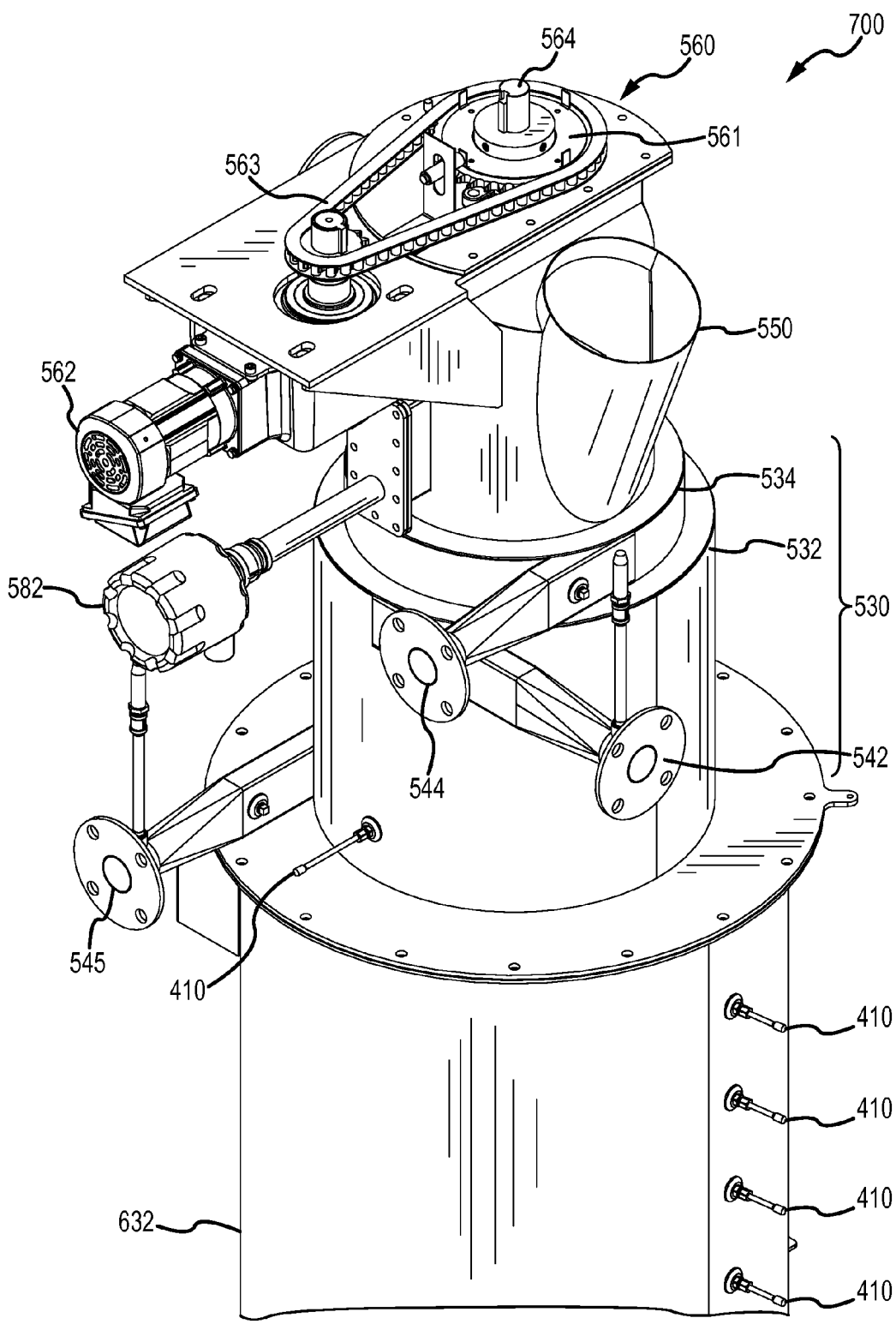
FIG. 7 is an isometric view of an upper portion of a gasifier according to an embodiment of the disclosure.
Figure 8:
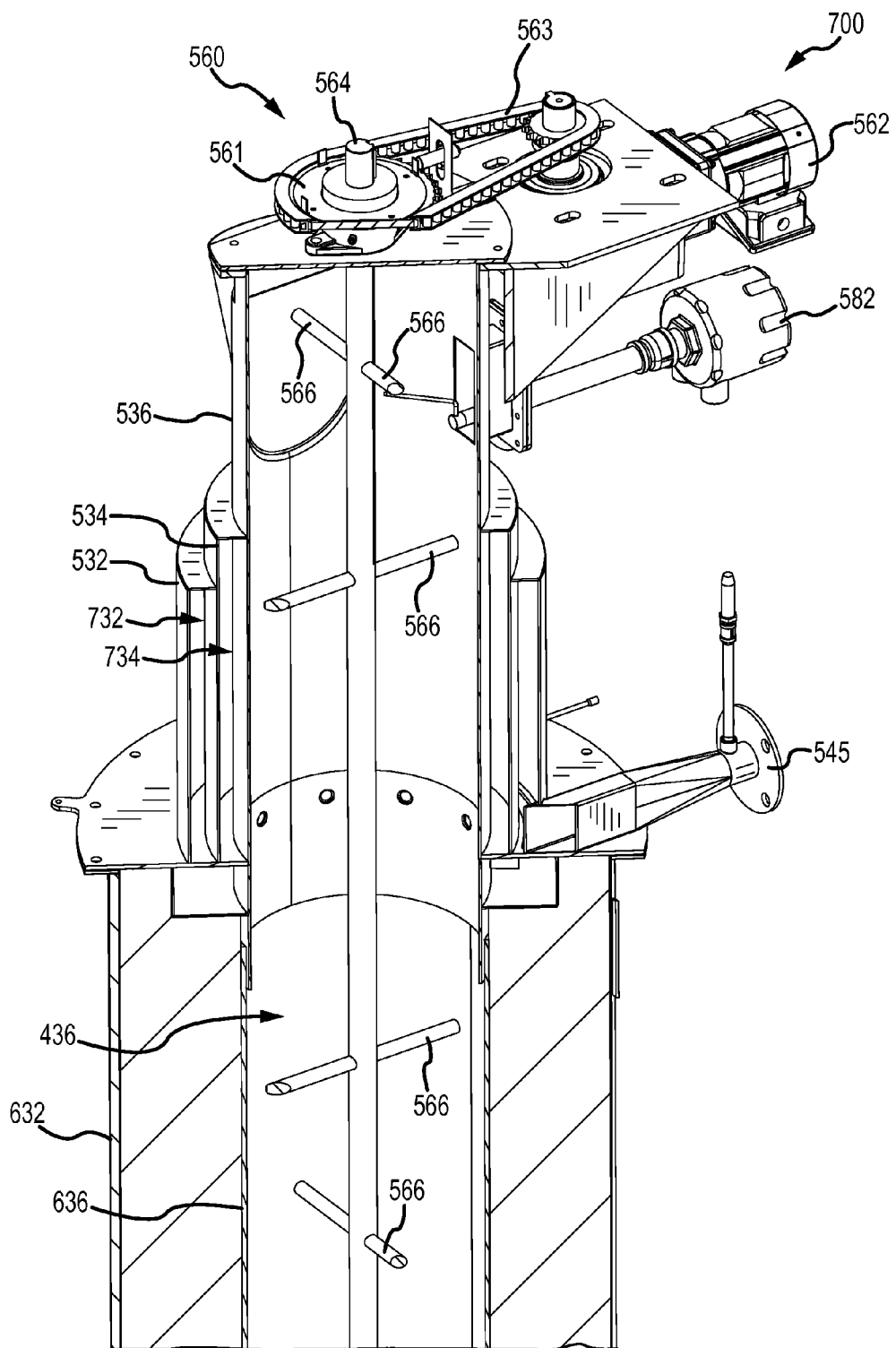
FIG. 8 is a cross-sectional isometric view of an upper portion of a gasifier according to an embodiment of the disclosure.

FIG. 7 depicts a zoomed-in, isometric view of an upper portion of a gasifier 700, such as upper section 510 of gasifier 400 of FIGS. 4-6. FIG. 8 depicts a cross-sectional view of the upper portion of gasifier 700 of FIG. 7, as viewed from a different perspective. The upper portion of gasifier 700 includes elements that have been previously described with respect to the gasifier 400 of FIGS. 4-6. Those elements are shown in FIGS. 7 and 8 using the same reference numbers as used in FIGS. 4-6, and operation of the common elements is as previously described. Consequently, in the interest of brevity, a detailed description of the operation of these elements will not be repeated. As previously described with reference to FIGS. 4-6, preheating of the combustion air and the feedstock improves efficiency of the gasification process. The upper portion of gasifier 700 may include a preheater assembly 530 that is formed of a cyclonic triple jacket (e.g., three concentric chambers).

Preheater assembly 530 may serve two functions: first, preheater assembly 530 may preheat incoming combustion air supplied to gasification chamber 436; and second, preheater assembly 530 may also conduct heat to the feedstock supplied via feedstock inlet 550. Preheating the combustion air and the feedstock reduces unwanted moisture, and promotes reactions, such as gasification, to move forward. Preheater assembly 530 may utilize the heat produced in the exothermic reactions of gasification by cycling the hot syngas back to the incoming feedstock and combustion air via conductive and radiative heat transfer. The preheated feedstock then reacts more readily and produces more heat as compared with non-preheated combustion air and feedstock, and thus creates a more efficient gasification process. Further, preheating facilitates the start-up process and enables the gasifier to operate using a wider range of feedstock types.

Preheater assembly 530 is of multi-chamber construction where each chamber is defined by three annular cylindrical walls. The innermost wall of the preheater is upper fire tube 536. Upper fire tube 536 may provide the vertical wall circumferencing combustion/gasification chamber 736. Combustion/gasification chamber 736 may form an upper portion of gasification chamber 436 of FIGS. 4-6. Preheater assembly 530 may include two additional annular walls that are concentric to upper fire tube 536. Preheater shell 534, in combination with upper fire tube 536 may define outer and inner walls of syngas/preheater chamber 734, respectively. A channel for combustion air is formed by preheater shell 534 and outer shell 532, to create combustion air chamber 732. This creates a second annular cylindrical chamber surrounding combustion/gasification chamber 736. Thus, syngas/preheater chamber 734 is sandwiched between innermost combustion/gasification chamber 736 and outer-most combustion air chamber 732.

Each chamber, air chamber 732 and syngas/preheater chamber 734, has both an inlet and an outlet that enables the respective gases (air and syngas) to move into and through each of their respective chambers. Combustion air inlet 542 provides an inlet for air to enter air chamber 732 near its top and likewise preheater syngas inlet 544 is located near the top of syngas/preheater chamber 734. Combustion air inlet 542 and preheater syngas inlet 544 are angled tangentially to their respective chambers to facilitate annular flow of the gasses. Outlets for each chamber are located at the bottom of preheater 530 as preheater syngas outlet 545 (angled tangentially to syngas/preheater chamber 734) and tuyere 543, which serves as the outlet for air chamber 732. In some examples, preheater assembly 530 may be encased in refractory insulation, such as alumina, to reduce heat loss to the atmosphere. In some examples, the insulation may be installed in two separate preformed halves that are fitted together around the preheater assembly 530, and then held in place via an attachment means, such as metal banding. In some cases, the inlets and outlets may be located at locations other than top and bottom.

Figure 9:
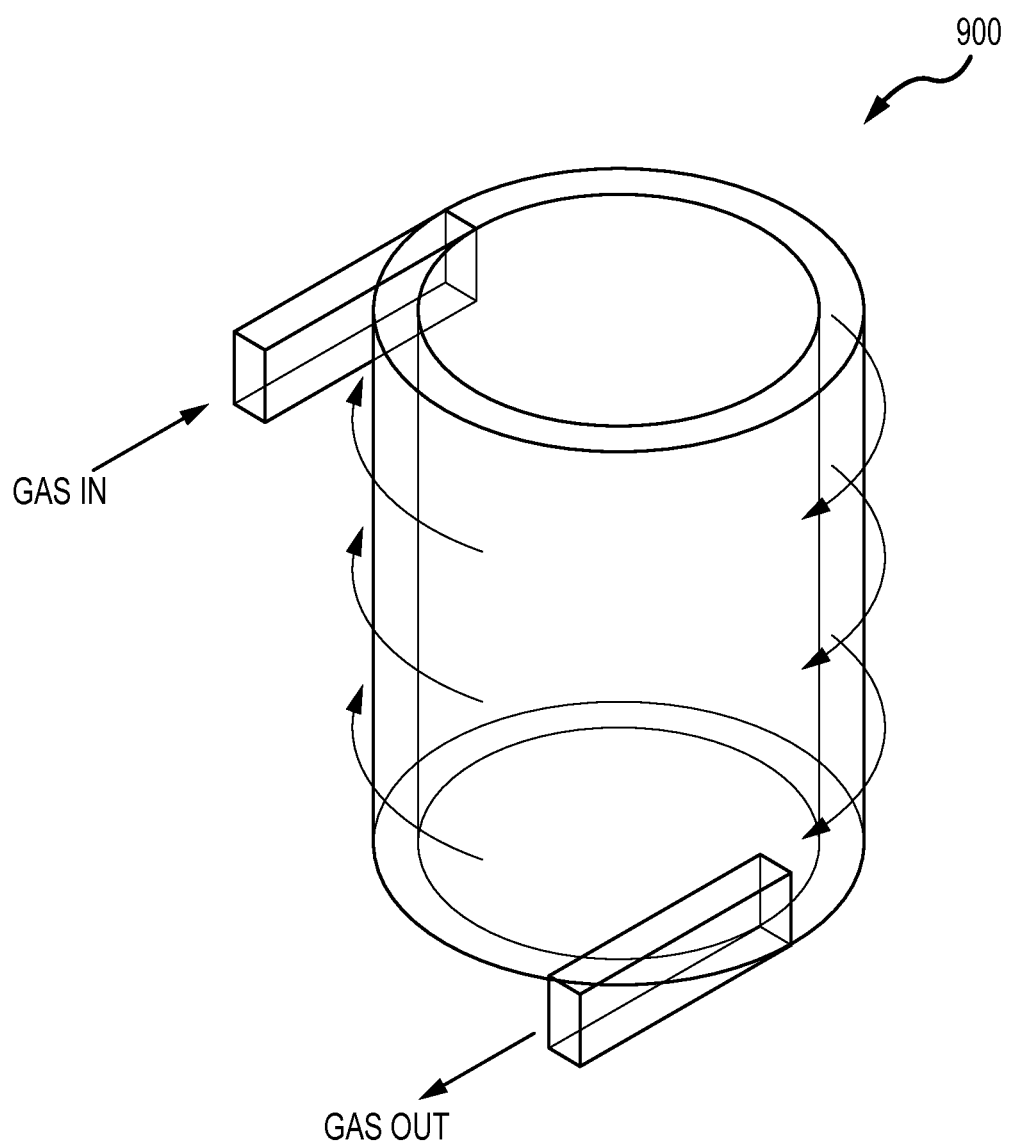
FIG. 9 is an illustration of gas flow through a circular chamber according to an embodiment of the disclosure.

In operation, the syngas and the combustion air may move in helical paths through their respective chambers 734 and 732. The helical pattern is induced by the tangential inlets and the arrangement may produce high gas stream velocities and heat transfer coefficients. In some examples, gas velocities of approximately 16 m/sec may be induced. Further, this arrangement produces counter-flow heat exchange between the syngas and the combustion air, and a heat transfer coefficient of ~350 $W/m^2*K$ may be realized using this configuration. FIG. 9 provides an illustration of the helical pattern of a gas flowing through either of syngas/preheater chamber 734 or combustion air chamber 732.

As heat is transferred from the hot syngas stream to the atmospheric temperature combustion air stream via preheater shell 534, the combustion air within combustion air chamber 732 may be heated from its atmospheric temperature to a temperature greater than 250° C. This preheated combustion air may exit combustion air chamber 732 through any of several tuyeres 543, for use in the gasification process occurring within combustion/gasification chamber 736.

At preheater syngas inlet 544, high velocity syngas may enter syngas/preheater chamber 734. As the syngas moves around and through syngas/preheater chamber 734, heat is transferred from the syngas to the combustion air, causing the syngas to lose momentum. The syngas may lose momentum and consequently, velocity as it traverses through syngas/preheater chamber 734. Thus, the velocity of the syngas output from syngas/preheater chamber 734 via preheater outlet 545 is less than the input velocity received at preheater syngas inlet 544. Conversely, the increase in air temperature of the combustion air as it propagates through combustion air chamber 732 increases velocity of the combustion air flowing through combustion air chamber 732 to the output of at tuyeres 543.

Further, as feedstock enters the upper portion of gasifier 700 via feedstock inlet 550 and comes into direct and radiative contact with upper fire tube 536, the feedstock is heated and dried to remove moisture and prepare the feedstock for the gasification process. In some examples, moisture levels of less than 20% are desired and may be achieved using the described system. The feedstock then moves down further into combustion/gasification chamber 736, where it is gasified. Some or all of the resultant syngas may be fed into syngas/preheater chamber 734 via preheater syngas inlet 544.

Figure 10:
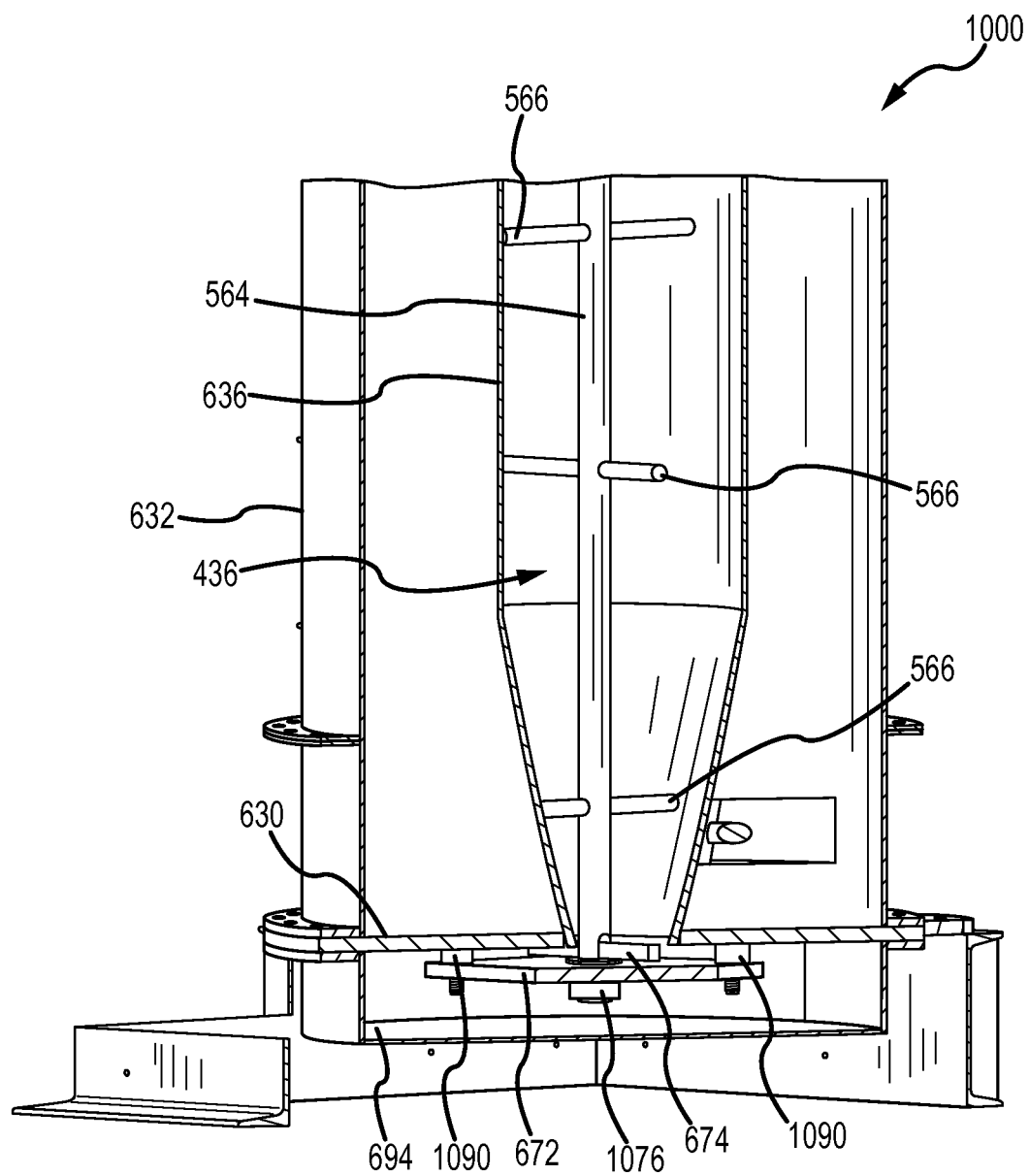
FIG. 10 is a cross-sectional isometric view of a lower portion of a gasifier according to an embodiment of the disclosure.

FIG. 10 depicts a zoomed-in, cross sectional isometric view of a portion of a lower portion of a gasifier 1000, such as a portion of lower section 610 of gasifier 400 of FIGS. 4-6. FIG. 10 further depicts a sweep rod 672 and a sweep plate 674. The lower portion of gasifier 1000 includes elements that have been previously described with respect to gasifier 400 of FIGS. 4-6. Those elements have been shown in FIG. 10 using the same reference numbers as used in FIGS. 4-6, and operation of the common elements is as previously described. Consequently, in the interest of brevity, a detailed description of the operation of these elements will not be repeated in reference to FIG. 10.

Biomass gasification, although a relatively clean process, does generate some waste streams such as char and slag. These waste streams, if not properly removed from a gasifier can cause clogging and limit the function of the system. Stir rod 564, sweep rod 672, and sweep plate 674 may help address issues related to column agitation, waste removal, and maintaining open gas flow by moving biochar through upper fire tube 536 and destroying large pieces of slag that develop and would tend to accumulate at the bottom of a gasifier during the gasification process. Column agitation, waste removal, and maintaining open gas flow allow a gasifier to run for longer periods of time between maintenance and allow it to produce higher quality syngas.

Furthermore, the lower portion of gasifier 1000 may be designed to continuously move feedstock and byproduct down through gasification chamber 436 and through the gap formed between fire tube base 630 and sweep plate 674. By actively moving biochar, the flow rate of feedstock through the gasification chamber 436 may be controlled. Increasing the biochar ratio at an outlet may increase the $H_2$:CO ratio in the syngas, thereby increasing the energy content of the syngas.

Stirring mechanism 560 may be composed of multiple parts including, stir rod 564, sweep plate 674, sweep rod 672, and an attachment means 1076 to hold stir rod 564 in place (e.g., a lock collar, bushing, and thrust washer). Stir rod 564 may extend vertically through gasification chamber 436 and through sweep plate 674, and is positioned normal to fire tube base 630. Stir rod 564 may be fitted with attachment means 1076 below sweep plate 674 to hold stir rod 564 in place. Sweep rod 672 may be affixed (e.g., welded) perpendicular to stir rod 564, and is positioned parallel to sweep plate 674 with a small clearance above sweep plate 674.

During operation a motor, such as motor 562 of FIGS. 4-6, may turn stir rod 564 via a drive chain, such as drive chain 563 of FIGS. 4-6. Turning stir rod 564 may cause sweep rod 672 to move in a circular path across the sweep plate 674 and mixing rods 566 to rotate within gasification chamber 436. As the feedstock gasifies, slag and char move down through gasification chamber 436, onto sweep plate 674. The rotating movement of stir rod 564 may cause mixing rods 566 to agitate the feedstock and help break up accumulating char as it descends the length of the gasifier. The rotating movement of stir rod 564 may also cause sweep rod 672 to rotate and push accumulating char particles off sweep plate 674 into byproduct collection pan 694 below.

Spacers 1090 may be installed to form a gap between the bottom of upper fire tube 536 and the top of sweep plate 674. The gap between the base of the upper fire tube 536 and the top of sweep plate 674 allows the generated syngas to flow down upper fire tube 536 and over sweep plate 674 through this gap. Sweep rod 672 keeps the gap clear by pushing char and slag off sweep plate 674 to allow a path for the syngas to flow to an outlet, such as syngas outlet 680 of FIGS. 4-6.

Figure 11:
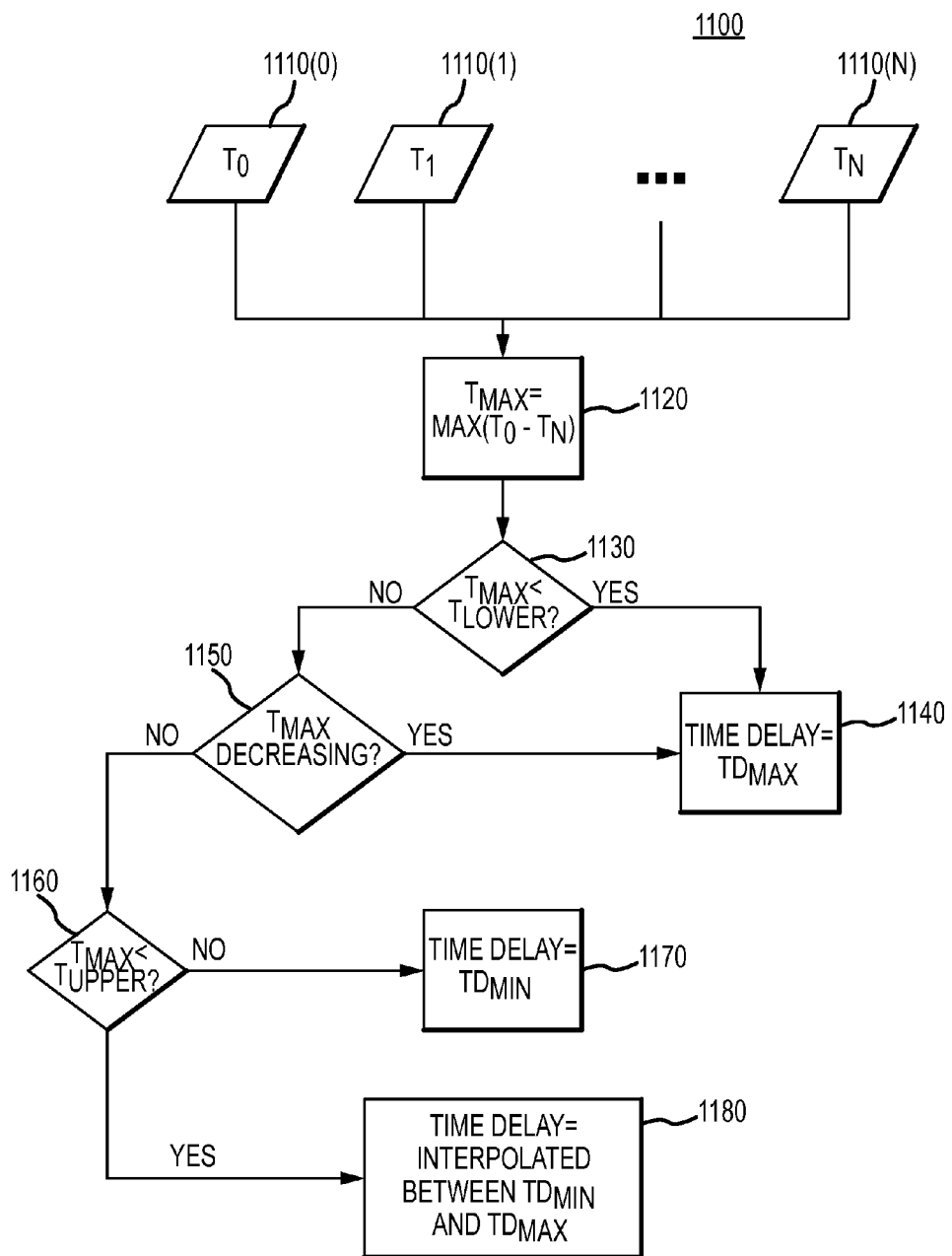
FIG. 11 is a flowchart for a method for controlling a stirring mechanism according to an embodiment of the disclosure.

FIG. 11 is a flowchart for a method 1100 for controlling stirring mechanism 560 according to an embodiment of the disclosure. The method illustrated by flowchart 1100 may be implemented by control system 370 of FIG. 3, based upon information gleaned from gasifier 400 of FIGS. 4-6, upper portion of gasifier 700 of FIGS. 7-8, and/or lower portion of gasifier 1000 of FIG. 10. As previously described, temperature measurements taken via temperature sensors 410 that take temperature data along the combustion path in gasification chamber 436 may be used to identify a maximum temperature in the gasification chamber 436 and may be used to control a flow rate of the feedstock through the gasification chamber 436 to maintain the desired temperature threshold value. A control system may alter the flow rate through gasification chamber 436 by activating or deactivating stirring mechanism 560. As stirring mechanism 560 is activated, the flow rate of the feedstock through the gasification chamber 436 may increase, and when stirring mechanism 560 is deactivated, flow rate through the gasification chamber 436 may decrease. Additionally, stirring mechanism 560 may also prevent the feedstock from bridging in the gasification chamber 436.

Method 1100 may be used to regulate operation of stirring mechanism 560. Control of the gasifier's internal temperatures is critical to efficient gasification of the feedstock within the gasifier. Temperatures too high will promote formation of 'clinkers' or slag which can clog downstream piping, reduce syngas flow and reduce temperatures. Production of 'clinkers' and slag may result in degradation of the syngas quality and increase production of water and tar, which requires additional energy to filter the 'clinkers' and slag from the syngas stream. Method 1100 may regulate increasing temperature by stirring more frequently (e.g., reduced time delay between stir actions), and may limit decreasing temperatures by stirring less frequently (e.g., increased time delay between stir actions). Preferably, a stir action is a fixed speed, fixed duration activation of stirring mechanism 560, however other stir activations may be used, depending upon feedstock type, feedstock moisture levels, ambient air temperature swings, or other such variables. Method 1100 may be used to control the on/off cycle for stirring mechanism 560 as a function of the measured internal temperature of the gasifier 400. Determining on/off cycles for stirring mechanism 560 as a function of measured internal temperature of gasifier 400 allows for self-adjustment in response to changing internal temperatures.

Method 1100 may include receiving temperature data $T_0$ to $T_N$ from a plurality of temperature sensors, at 1110(0-N). The temperature data may be received from, for example, temperature sensors 410 of FIG. 1. Method 1100 may further include determining a maximum temperature $T_{MAX}$ of the received temperature data, at 1120. Method 1100 may further include determining whether a maximum measured temperature, $T_{MAX}$, is less than a lower temperature threshold $T_{LOWER}$, at 1130. If the maximum temperature $T_{MAX}$ is less than a lower temperature threshold $T_{LOWER}$, method 1100 may include setting a time delay between stirring actions to a maximum time delay limit $TD_{MAX}$ (e.g., less frequent stirring actions), at 1140.

If the maximum temperature $T_{MAX}$ is greater than a lower temperature threshold $T_{LOWER}$, method 1100 may include determining whether the maximum temperature $T_{MAX}$ is decreasing based on a comparison with a previous sample, at 1150. If the maximum temperature $T_{MAX}$ is decreasing based on the comparison with the previous sample, method 1100 may include setting the time delay between stirring actions to the maximum time delay limit $TD_{MAX}$ (e.g., less frequent stirring actions), at 1140.

If the maximum temperature $T_{MAX}$ is not decreasing based on the comparison with the previous sample, method 1100 may further include determining whether the maximum temperature $T_{MAX}$ is less than an upper temperature threshold $T_{HIGH}$, at 1160. If the maximum temperature $T_{MAX}$ is greater than or equal to the upper temperature threshold $T_{UPPER}$, method 1100 may include setting the time delay between stirring actions to a minimum time delay limit $TD_{MIN}$ (e.g., more frequent stirring actions), at 1170.

If the maximum temperature $T_{MAX}$ is less than the upper temperature threshold $T_{UPPER}$, method 1100 may include interpolating the time delay between the minimum time delay limit $TD_{MIN}$ and the maximum time delay limit $TD_{MAX}$, at 1180. For example, the time delay may be linearly interpolated between the minimum time delay limit $TD_{MIN}$ and the maximum time delay limit $TD_{MAX}$ based on where the maximum temperature $T_{MAX}$ falls between the lower temperature threshold $T_{LOWER}$ and the upper temperature threshold $T_{UPPER}$. In an example where the maximum temperature $T_{MAX}$ is less than the upper temperature limit $T_{UPPER}$ and is not decreasing, the time delay may be determined as follows:

$$TD = \frac{(T_{MAX} - T_{LOWER}) \times (TD_{MAX} - TD_{MIN})}{T_{UPPER} - T_{LOWER}} + TD_{MIN}$$

Method 1100 may be designed to efficiently produce biochar output from the gasifier, as biochar is a valuable byproduct. Utilizing the upper and lower temperature limits, method 1100 may hold internal gasifier temperatures in a range that not only protects the gasifier, but also provides the best compromise between high quality syngas flow, and greatest biochar production. Stirring mechanism 560, working in conjunction with method 1100, may be most beneficial in working with low-density feedstock, such as wheat straw, as low-density wheat straw has a tendency to develop blockages and/or tunneling in a gasifier column, rather than remaining in motion as it flows through the gasifier column.

Method 1100 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, method 1100 of FIG. 11 may be implemented by a computing system using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc. One or more processing units and computer readable mediums encoding executable instructions may be used to implement all or portions of encoders or encoding systems described herein.

The above description of illustrated embodiments of the disclosure is not intended to be exhaustive or to limit the disclosure to the precise form disclosed. While specific embodiments of, and examples of, the disclosure are described in the foregoing for illustrative purposes, various equivalent modifications are possible within the scope of the disclosure, as those skilled in the relevant art will realize. Moreover, the various embodiments described above can be combined to provide further embodiments. Accordingly, the disclosure is not limited by the disclosure, but instead the scope of the disclosure is to be determined entirely by the following claims.

What is claimed is:

1. A mobile gasification system comprising:
   a gasifier configured to gasify feedstock by reacting the feedstock with combustion air to provide syngas, the gasifier comprising:
   a gasification chamber including an upper section and a lower section, the upper section including an upper fire tube operably coupled to a lower fire tube in the lower section;
   a preheater assembly configured to transfer heat from the syngas to the combustion air and the feedstock, wherein the preheater assembly includes an inner tube and an outer tube that encircle the upper fire tube to form two annular channels;
   wherein an outer channel of the two annular channels is operably coupled to a combustion air inlet to receive the combustion air and provide the combustion air to the gasification chamber, and wherein an inner channel of the two annular channels is operably coupled to an output of the gasifier to receive the syngas from the gasifier and provide the syngas to an output of the inner channel; and
   wherein the outer channel is connected to the combustion air inlet at a top portion of the outer channel, the combustion air inlet is tangential to the outer channel, and the outer channel is in fluid communication with the gasification chamber via one or more passages therebetween.

2. The mobile gasification system of claim 1, wherein the outer channel is connected to the combustion air inlet at a top portion of the outer channel, wherein the plurality of passages is configured as a plurality of tuyeres, wherein a bottom portion of the outer channel is connected to the plurality of tuyeres, wherein one or more of the plurality of tuyeres are configured to inject the combustion air into the gasification chamber from the outer channel.

3. The mobile gasification system of claim 1, wherein the inner channel is connected to an inlet at a top portion of the inner channel that is configured to receive the syngas, wherein the inlet is tangential to the inner channel, wherein a bottom portion of the inner channel is connected to an outlet that is configured to provide the syngas from the inner channel.

4. The mobile gasification system of claim 1, wherein the gasifier comprises a stirring mechanism configured to stir the feedstock as it propagates through the gasification chamber.

5. The mobile gasification system of claim 4, wherein the stirring mechanism comprises:
   a stir rod extending vertically through the upper fire tube and the lower fire tube; and
   a plurality of mixing rods affixed to the stir rod extending out from the stir rod at an angle perpendicular to the stir rod.

6. The mobile gasification system of claim 5, wherein the gasifier further comprises a sweep plate affixed to a base of the lower fire tube, wherein the sweep plate is positioned below a base of the lower fire tube such that a gap is formed between a lower edge of the lower fire tube and the sweep plate, wherein the stir rod extends through the sweep plate, and wherein the stirring mechanism comprises:
   a sweep rod affixed to the stir rod, wherein the sweep rod is configured to sweep material that has collected on the sweep plate off of the sweep plate.

7. The mobile gasification system of claim 5, wherein the stirring mechanism further comprises a motor configured to rotate the stir rod during a stirring action.

8. The mobile gasification system of claim 7, further comprising a control system configured to control the stirring action based on temperature data from the gasification chamber.

9. The mobile gasification system of claim 8, wherein the gasifier further comprises a plurality of temperature sensors, wherein a temperature sensor is configured to measure temperature data at a respective location of the gasification chamber, wherein the control system is configured to receive the temperature data from the plurality of temperature sensors.

10. The mobile gasification system of claim 9, wherein the gasifier further comprises a level sensor configured to detect a level of the feedstock in the upper section, wherein the feedstock is transferred to the gasifier responsive to an indication from the level sensor.

11. A gasification system, comprising:
    a gasifier configured to gasify feedstock by reacting the feedstock with combustion air to provide syngas, the gasifier comprising:
    a gasification chamber including an upper section and a lower section, the upper section including an upper fire tube operably coupled to a lower fire tube in the lower section;
    a preheater assembly configured to transfer heat from the syngas to the combustion air and the feedstock, wherein the preheater assembly includes:
    an inner tube and an outer tube that encircle the upper fire tube to form two annular channels, where a portion of the outer tube extends beyond a lower bound of the inner tube and a portion of the inner tube extends beyond an upper bound of the outer tube, and where the outer tube defines an outer channel and the inner tube defines an inner channel;
    a plurality of tuyeres extending between the upper fire tube and the outer tube each configured to provide fluid communication from the outer channel to the upper fire tube, the plurality of tuyeres being connected to the upper fire tube at a section thereof below the inner channel;
    wherein the outer channel is operably coupled to a combustion air inlet to receive the combustion air and provide the combustion air to the gasification chamber through the plurality of tuyeres, and the combustion air inlet is angled tangentially from the outer channel; and wherein the inner channel is operably coupled to an output of the gasification chamber via a syngas inlet configured to provide syngas to the inner channel, and the syngas inlet is angled tangentially from the inner channel.

12. The gasification system of claim 11, wherein:
the outer channel is connected to the combustion air inlet at a top portion of the outer channel;
a bottom portion of the outer channel is connected to the plurality of tuyeres; and
the plurality of tuyeres include one or more valves configured to control injection of the combustion air into the gasification chamber.

13. A mobile gasification system comprising:
a gasifier configured to gasify feedstock by reacting the feedstock with combustion air to provide syngas, the gasifier comprising:
a gasification chamber including an upper section and a lower section, the upper section including an upper fire tube operably coupled to a lower fire tube in the lower section;
a preheater assembly configured to transfer heat from the syngas to the combustion air and the feedstock, wherein the preheater assembly includes an inner tube and an outer tube that encircle the upper fire tube to form two annular channels;
wherein an outer channel of the two annular channels is operably coupled to a combustion air inlet to receive the combustion air and provide the combustion air to the gasification chamber, and wherein an inner channel of the two annular channels is operably coupled to an output of the gasifier to receive the syngas from the gasifier and provide the syngas to an output of the inner channel;
wherein the outer channel is connected to the combustion air inlet at a top portion of the outer channel and the outer channel is connected with the gasification chamber via one or more passages therebetween; and
wherein the inner channel is connected to a syngas inlet at a top portion of the inner channel that is configured to receive the syngas, wherein the syngas inlet is tangential to the inner channel, wherein a bottom portion of the inner channel is connected to an outlet that is configured to provide the syngas from the inner channel.

* * * * *